Patented June 25, 1929.

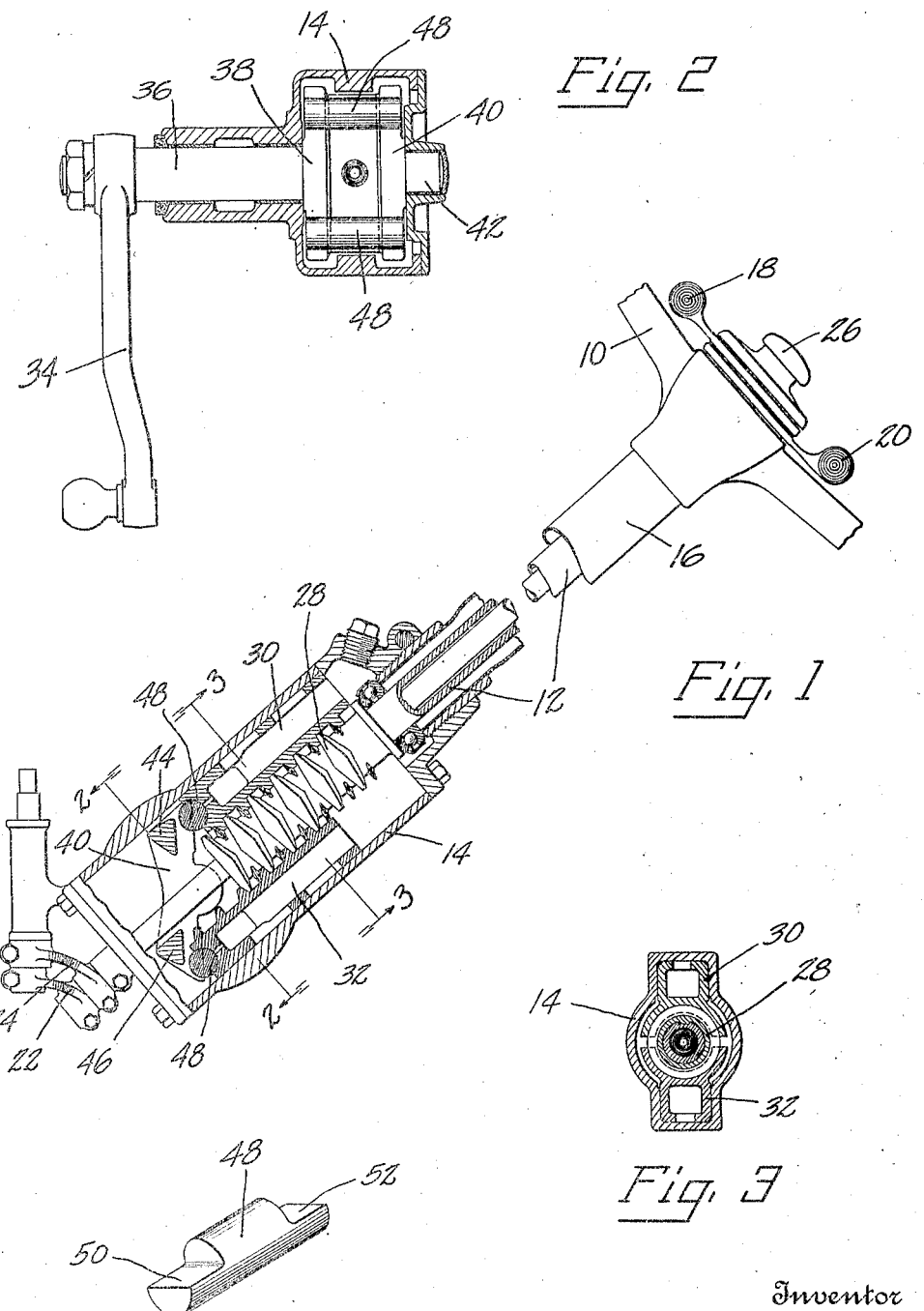

1,718,582

UNITED STATES PATENT OFFICE.

WILLIAM C. RODD, OF SAGINAW, MICHIGAN, ASSIGNOR TO GENERAL MOTORS CORPORATION, OF DETROIT, MICHIGAN, A CORPORATION OF DELAWARE.

STEERING GEAR.

Application filed April 5, 1924, Serial No. 704,544. Renewed October 15, 1928.

This invention relates to steering gears of the type used on automobiles, and is illustrated as embodied in a gear having a pair of half nuts operated respectively by right and left threads on the steering shaft.

An object of the invention is to arrange the parts of a steering gear, of this very efficient and desirable type, in such a manner that the gear operates with the minimum adequate mechanical advantage and consequently at a substantial speed when the front wheels are directed straight ahead, and with progressively increasing mechanical advantage as the wheels are swiveled toward either extreme position, such an arrangement being the reverse of that heretofore used. It will be seen that the new arrangement is of practical advantage, in that the wheels are more easily turned when in their normal straight ahead position than when they approach either extreme position, while the increased speed is especially desirable at this time in that the wheels are usually in approximately this position, being only occasionally turned through a very large angle.

In one desirable arrangement, each of the above-described half-nuts carries a pin having a flat surface or surfaces operatively engaging one arm of a yoke straddling the steering shaft and operating the wheel-swiveling connections. As the pins thus have rectilinear movement with their respective half-nuts, they move along the chords of the arcs described by the opposite arms of the yoke, and therefore give the yoke its greatest speed of movement in its middle position when the pins are at the centers of these chords. The mechanical advantage of the yoke arms is at that time quite adequate for easy operation, and is arranged to increase progressively as the pins move toward the ends of the chords as the swiveling becomes more difficult, due to the wheels approaching one of their extreme positions.

The above and other objects and features of the invention, including various novel combinations of parts and desirable particular constructions, will be apparent from the following description of one illustrative embodiment shown in the accompanying drawings, in which:

Figure 1 is a view, partly in side elevation and partly in vertical section, of a steering column assembly embodying the invention;

Figure 2 is a section on the line 2—2 of Figure 1, but with the parts in their central positions, i. e. with the wheels of the vehicle straight ahead;

Figure 3 is a section on the line 3—3 of Figure 1, showing how the half-nuts are held from turning by the outer casing; and Figure 4 is a perspective view of one of the pins used to transmit the operating force from the half-nuts to the yoke.

The invention is shown as embodied in a steering column assembly comprising a steering wheel 10 operating a hollow steering shaft 12 supported in a lubricant-tight casing 14 and protected by a sleeve 16, there being the usual spark and throttle controls 18 and 20 operating central tubes connected to gear sectors 22 and 24, and the usual horn button or switch 26. At 28 a portion of the steering shaft is formed with, or carries, intersecting right and left threads, each operating one of two half-nuts 30 and 32 held, as shown in Figure 3, by casing 14 in such a manner as to have rectilinear longitudinal movement only, in directions parallel to the axis of the steering shaft.

At the bottom of the steering column assembly is a steering arm 34, arranged to operate the wheel-swiveling connections, and which is carried by a rockshaft 36 perpendicular to the steering shaft 12. Shaft 36 is operated by a yoke straddling the steering shaft 12 and the central tubes operating the gear sectors 22 and 24, the yoke comprising a side member 38 secured to the rockshaft 36, and a side member 40 secured to a short stub shaft 42 in alinement with the rockshaft 36 and having a bearing in the casing 14. These side members are connected by cross portions 44 and 46, which may be integral with them, and which are arranged on opposite sides of the steering shaft 12. It will be seen that the yoke constitutes, in effect, a pair of oppositely extending double arms, each arm extending below and immediately adjacent one of the half-nuts 30 and 32.

According to an important feature of the invention, connection between each half-nut and the corresponding arm of the yoke is by means of a pin having a central cylindrical portion 48 seated in a semi-cylindrical recess in the bottom of its half-nut, and semi-cylindrical ends providing flat surfaces 50 and 52 slidably engaging the edges of the side members 38 and 40 of the yoke. It will be seen that these pins have rectilinear movement with their half-nuts, the ends 50 and 52 sliding as the yoke swings about the axis of shaft 36 so that the pins follow chords of the arcs through which the opposite arms of the yoke swing. As explained above, this secures the utmost speed consistent with easy operation, when the wheels are in their central straight-ahead position, while as the wheels approach either extreme angular position (at which time speed of turning is of less importance and the wheels turn harder), the mechanical advantage of the yoke is automatically increased.

While one illustrative embodiment of the invention has been described in detail, it is not my intention to limit its scope to that particular embodiment, or otherwise than by the terms of the appended claims.

I claim:

1. A steering gear comprising, in combination, a rotatable steering shaft having right-and-left threads intersecting each other on the same lower portion of the shaft, an outer casing supporting the shaft, a pair of longitudinally-movable half-nuts, one having a right thread and the other a left thread, in threaded engagement with said threaded portion of the steering shaft and held from rotation by said casing, said nuts being moved in opposite directions parallel to the axis of the steering shaft by rotation of the steering shaft, a steering arm adjacent the lower end of the steering shaft, a rockshaft perpendicular to the steering shaft and carrying the steering arm, a yoke straddling the steering column below its threaded portion and secured to the rockshaft to operate the rockshaft, with its opposite arms extending below the ends of the half nuts, and a pair of operating pins each having a flat portion slidably engaging one arm of the yoke and having a cylindrical portion rotatably mounted in the lower end of the corresponding half nut.

2. A steering gear comprising, in combination, a rotatable steering shaft having right-and-left threads, an outer casing supporting the shaft, a pair of longitudinally-movable half-nuts, one having a right thread and the other a left thread, in threaded engagement with the corresponding threads of the steering shaft and held from rotation by said casing, said nuts being moved in opposite directions parallel to the axis of the steering shaft by rotation of the steering shaft, a steering arm adjacent the lower end of the steering shaft, a rockshaft perpendicular to the steering shaft and carrying the steering arm, a yoke straddling the steering column and secured to the rockshaft to operate the rockshaft, with its opposite arms extending adjacent the half nuts, and a pair of operating pins each having flat ends slidably engaging one arm of the yoke and having a cylindrical central portion rotatably received in a cylindrical recess in the corresponding half nut.

3. A steering gear comprising a reciprocating member, a rocking member and a member interposed between said reciprocating member and said rocking member and having rocking engagement with the former and sliding engagement with the latter comprising a pin like member having a cylindrical portion and a flattened portion spaced lengthwise of its axis.

4. A steering gear comprising a reciprocating member having a cylindrical socket formed in one end thereof, a rocking member cooperating with the reciprocating member, and a member interposed between the reciprocating member and said rocking member comprising a part having a cylindrical portion fitting in said socket and a flattened portion sliding on said rocking member, said portions being spaced lengthwise of the axis of the part.

5. A steering gear comprising a plurality of oppositely reciprocating members, a rocking member, and a member interposed between the ends of the rocking members and the reciprocating member, each of said members being in the form of a pin having a cylindrical portion in rocking engagement with the reciprocating member and having flattened ends in sliding engagement with said rocking member.

In testimony whereof I affix my signature.

WILLIAM C. RODD.